T860,023

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 25, 1969

860 O.G. 1010

768,931

OXYMETHYLENE POLYMERS

Brian Edmund Jennings, Welwyn, and John Carsell McGowan, Harpenden, England, assignors to Imperial Chemical Industries Limited, Millbank, London, England, a corporation of Great Britain

Continuation of application Ser. No. 715,445, Mar. 22, 1968. This application Oct. 18, 1968. Published Mar. 25, 1969

Claims priority, application Great Britain, Aug. 14, 1963, 32,132

Class 260—53

No Drawing. 19 Pages Specification

An oxymethylene copolymer containing 80–99.5% molar of oxymethylene units and 0.1 to 20% of units —RO— derived from phenols. Preferred phenols have the formula

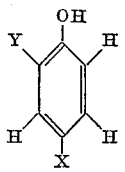

wherein X is halogen or nitro and Y is hydrogen, halogen or nitro. The polymers are made by polymerizing at least one mole of a cyclic oligomer of formaldehyde, e.g. trioxane with the corresponding phenol with a catalyst suitable for polymerizing trioxane.